United States Patent
Graf

(10) Patent No.: US 6,416,871 B1
(45) Date of Patent: Jul. 9, 2002

(54) SURFACE MODIFICATION OF HIGH TEMPERATURE ALLOYS

(75) Inventor: Thomas Graf, Steinhorst (DE)

(73) Assignee: Sandvik AB, Sandviken (SE)

(*) Notice: Subject to any disclaimer, the term of this patent is extended or adjusted under 35 U.S.C. 154(b) by 0 days.

(21) Appl. No.: 09/579,540

(22) Filed: May 26, 2000

(51) Int. Cl.[7] .............................................. B32B 15/04
(52) U.S. Cl. ........................ 428/469; 428/364; 428/402; 428/403; 428/615
(58) Field of Search ................................ 428/34.4, 336, 428/389, 404, 655, 457

(56) References Cited

U.S. PATENT DOCUMENTS

| | | | |
|---|---|---|---|
| 3,773,549 A | 11/1973 | Elbert et al. ............... 117/129 |
| 3,847,682 A | 11/1974 | Hook ......................... 148/12.1 |
| 3,907,611 A | 9/1975 | Sasame et al. ............. 148/6.3 |
| 3,920,583 A | * 11/1975 | Pugh ........................ 252/465 |
| 3,992,161 A | 11/1976 | Cairns et al. ............. 29/182.5 |
| 4,079,157 A | 3/1978 | Yagi et al. ................. 427/380 |
| 4,096,095 A | 6/1978 | Cairns |
| 4,230,489 A | * 10/1980 | Antill ......................... 75/124 |
| 5,073,409 A | 12/1991 | Anderson et al. ......... 427/217 |
| 5,114,470 A | 5/1992 | Biancaniello et al. ........ 75/338 |
| 5,160,390 A | * 11/1992 | Yukumoto et al. ......... 148/325 |
| 5,366,139 A | 11/1994 | Jha et al. ................... 228/193 |
| 5,476,554 A | * 12/1995 | Ishii et al. ................. 148/325 |
| 6,214,473 B1 | * 4/2001 | Hunt et al. ................. 428/469 |

FOREIGN PATENT DOCUMENTS

| | | |
|---|---|---|
| EP | 0 161 756 A1 | 11/1985 |
| EP | 0 165 732 A1 | 12/1985 |
| EP | 0 225 047 A2 | 6/1987 |
| EP | 0 256 555 A2 | 2/1988 |
| EP | 0 258 969 A2 | 3/1988 |
| EP | 0 363 047 A1 | 4/1990 |
| EP | 0 534 864 A | 3/1993 |
| EP | 0 818 552 A | 1/1998 |
| GB | 2 048 955 A | 12/1980 |
| GB | 2 156 863 A | 10/1985 |
| JP | 50-28446 | 3/1975 |
| SE | 467414 | 7/1992 |
| WO | 94/25206 | 11/1994 |
| WO | 95 00674 A | 1/1995 |
| WO | WO 00 79017 A | 12/2000 |

* cited by examiner

Primary Examiner—Deborah Jones
Assistant Examiner—Gwendolyn Blackwell-Rudasill
(74) Attorney, Agent, or Firm—Burns, Doane, Swecker & Mathis, L.L.P.

(57) ABSTRACT

A surface-modified material and its associated method have been developed for surface modification of high temperature resistance alloys, such as FeCrAl alloys, in order to increase their oxidation resistance. The surface of the alloy is modified by treating it with a fluid, such as water-based colloidal silica dispersion. By this surface modification, the useful life of thin parts, such as wire and foil, has been significantly increased.

8 Claims, 2 Drawing Sheets

Al content of the matrix due to cyclic oxidation. Sample: Wire 0.7mm diameter

Al content of the matrix due to cyclic oxidation. Sample: foil, 50μm in thickness

SURFACE MODIFICATION OF HIGH TEMPERATURE ALLOYS

FIELD OF THE INVENTION

The present invention relates generally to surface modification of metallic materials and alloys resisting high temperatures. In particular, it relates to FeCrAl alloys that are modified by the application of a fluid, in particular a water-based silica dispersion.

BACKGROUND OF THE INVENTION

Pure aluminum under normal atmospheric conditions forms a protective coating mainly consisting of Al-oxide on its surface, which makes it highly resistant to ordinary corrosion for a practically unlimited amount of time. Alloys containing a sufficiently high content of aluminum, such as FeCrAl alloys, also form aluminum oxide on the surface at exposure to high temperatures, e.g. at 1000° C. However, such alloys can have a limited life especially when the alloy is in the form of thinner dimensions, such as 50 μm thick foils. This is due to break-away oxidation, and oxidation of iron and chromium when the matrix is depleted of aluminum due to aluminum oxide formation. The most effective way to increase the life time, especially for foils, is to engineer the first-built, protective aluminum oxide layer.

Common, conventional methods for increasing the life of high temperature resistant alloys are:

a) Alloying with rare earth metals to decrease the growth rate of aluminum oxide; and b) Introduction of a dispersion of small inclusions e.g. oxides, carbides or nitrides into the alloy.

At high temperatures, ferritic materials of the FeCrAl type have good oxidation properties but a relatively low strength. It is known that the strength at a high temperature, and in particular high temperature strength and creep strength, may be improved by adding materials that impede grain boundary sliding and dislocation movements in the alloy. Thus, grain boundary sliding may be counteracted on one hand by a reduction of the grain boundary surface, i.e., by increasing the grain size, and on the other hand by the introduction of stable particles that hinder the mobility of remaining grain surfaces, the order of magnitude of these introduced particles being 50 to 1000 nm. Moreover, the high temperature strength of the alloy may be increased by hindering dislocation movements. Particles for this purpose should preferably have an average size equal to or smaller than about 10 nm and be evenly distributed with an average distance between particles of 100 to 200 nm. These particles have to be extremely stable towards the metal matrix in order to avoid becoming dissolved or coarser with time. Suitable particle-forming materials to counteract grain boundary sliding and dislocation movements may be stable nitrides of primarily titanium, hafnium, zirkonium and vanadium, oxides of Al, Y, Th, Ca, . . . , carbides of Ti, Zr, V, Ta, Vd, . . . and mixtures of the above.

However, when making use of the above method, it has been established that the presence of Al, which is a relatively strong nitride former, leads to a decreased nitrogen solubility and makes the transport of nitrogen in the material more difficult. In turn, this brings about the inconvenience that a sufficiently fine separation of titanium nitride is not attained. Further, there is a risk that aluminum is bound in the form of aluminum nitride, which is detrimental for the oxidation properties of the alloy. This aluminum nitride may only be dissolved at high temperatures leading to the formation of titanium nitride. However, this results in too coarse a titanium nitride to satisfactorily counteract dislocation movements. Moreover, the presence of aluminum may also lead to separation of aluminum titanium nitride, which again is too coarse for the intended purposes.

Prior art citations which illustrate the nitride forming technique are EP-A225 047, EP-A-256 555, EP-A-161 756, EP-A-165 732, EP-A-363 047, GB-A-2 156 863, GB-A-2 048 955, EP-A-258 969, U.S. Pat. Nos. 3,847,682, 3,992, 161, 5,073,409 and 5,114,470.

Thus, when applying nitriding methods to the above aluminum oxide forming high temperature alloys, the nitrogen will primarily be bound as aluminum nitride. This brings about two disadvantages. First, the ability of the alloys to form a protective aluminum oxide layer is limited. Second, the formed nitrides become too large and are not sufficiently stable.

In view of these inconveniences with nitrides, another method of improving the life of thin heat resistant materials is highly desirous, in particular for thin-walled articles. This method involves:

c) Increasing the aluminum content, or the contents of other elements with high oxygen affinity, in the matrix.

This may be achieved in different ways. According to one technique, gas atomization of aluminum metal is performed with a suitable inert gas, such as argon, and to which an alloy powder is introduced into the atomization gas. From the atomization process a mixture of aluminum powder and alloy powder is obtained. The amount of introduced alloy powder is adapted to the conditions of the aluminum flow, so that a desired aluminum content is obtained in the mixture. Thereafter the powder mixture may be encapsulated and compacted according to known methods. According to one known method, the powder mixture is filled into sheet-metal capsules, which are evacuated and sealed. A capsule filled with a mixture consisting of >3% by volume of aluminum powder, preferably between 8 and 18% by volume, and the rest alloy powder, may be isostatically cold-pressed to a relatively high density. Then the capsule is heated to a temperature near the melting point of aluminum. The solid or liquid Al phase then forms a solid solution together with the ferrite phase of the alloy.

Compacted capsules according to the above may then be heat treated to form, e.g., bars, wire, tubes and strip by a suitable method, such as extrusion, forging or rolling.

The alloy powder may also be mechanically mixed with an aluminum powder in such proportions that a desired final aluminum content is obtained. Thereafter, the mixed powder may be encapsulated and compacted according to the above description.

However, when using mixing methods, there is always a risk of demixing of the introduced components, leading to heterogenous alloys. Further, the processes may be costly and complicated, e.g. in view of the risks of the powder components being oxidized. Further, these methods often lead to production difficulties such as embrittlement during rolling.

Yet another technique for increasing the life of high temperature alloys is:

d) Cladding the material with aluminum foils, see for instance U.S. Pat. No. 5,366,139. According to this technique, one melts, moulds and rolls a ferritic stainless FeCr strip and cold-welds aluminum upon both sides at the end stage. By a heat treatment, the Al is dissolved into the FeCr strip and a FeCrAl composition is achieved. The advantage is that one avoids several of the difficulties with conventional production of FeCrAl. For example, the FeCrAl melts require more expensive linings in ovens and ladles. Further, it is more difficult to extrude the FeCrAl alloys and they are more brittle, which makes the handling of ingots and blanks more difficult and increases the risk of cracks during cold rolling.

Dipping of thin-walled details may also be done by the process as disclosed in U.S. Pat. No. 3,907,611, according to which a considerable improvement of the resistance against high temperature corrosion and oxidation of iron-based alloys is obtained. The method comprises an aluminization by dipping in melted aluminum, followed by heat treatments. The first heat treatment is performed to form an intermetallic surface layer and the second to obtain a good binding of it.

U.S. Pat. No. 4,079,157 discloses a method of fabrication of material suited for use in a thermal reactor according to which austenitic stainless steel is dipped in a bath of molten aluminum with silicon added thereto, and then receives heat treatment in specific temperature ranges, whereby preferential diffusion of silicon in the steel material is effected. The diffused silicon prevents diffusion of aluminum and ensures that thickness of plating layers remains at a value such that distortion of a plated element does not occur even after prolonged service. However, this method of aluminizing or hot dip galvanizing leads to thick coatings on the substrate, often 50 to 100 micrometers and is therefore to be regarded as a completely different approach.

However, these methods do not offer the satisfactory protection of thin-walled FeCrAl products against breakaway oxidation.

JP-A-50-028 446 describes a method of washing a FeCrAl alloy with a suitable solvent or solution to remove halogens and then heat-treating to form a 40–100 Å thick $Al_2O_3$ film on the surface, to resist further oxidation. However, this document merely relates to the notoriously known fact that an alloy containing sufficient amounts of aluminum forms a protective oxide layer on its surface.

SUMMARY OF THE INVENTION

Therefore, it is an object of the present invention to provide a high temperature resistance alloy, and in particular a FeCrAl alloy, with a long useful life.

It is a further object of the present invention to make thin walled articles of FeCrAl alloys resistant at high temperatures during long times.

According to the present invention, this objects are achieved in a surprising way by modifying the surface of the alloy in accordance with the present invention.

According to a first aspect, the present invention provides a heat and oxidation resistant metallic material containing aluminum, the material comprising at least one of silicon and silicon-containing compounds applied onto its surface, the surface being in metallic or oxidized condition, thereby resulting in a surface layer or region containing amounts of the at least one silicon and silicon compounds and having an average thickness of 0.9 nm to 10 micrometers.

According to a second aspect, the present invention provides a method for surface modification of high temperature resistant metallic materials containing aluminum in order to increase oxidation resistance, the method comprising applying a fluid to said metallic surface.

For illustrative but non-limiting purposes, preferred embodiments of the invention will now be described with reference to the appended drawings. These are herewith briefly presented.

DETAILED DESCRIPTION OF PREFERRED EMBODIMENTS

According to the invention, the surface of the material is modified in a special way, since this surface modification has turned out to be a most important parameter to determine the life of thin heat resistant metallic materials. This surface modification is achieved by applying a fluid to the surface of the material. The best results having been obtained by using a water-based $SiO_2$ dispersion, which can include water-based colloidal silica. The fluid is applied to a bare or slightly oxidized metal surface of the finished product. The fluid can be applied before or after mounting in a treatment apparatus, e.g. an electric heater, or during processing. This treatment gives the advantage of influencing and hindering the formation of aluminum oxide and nucleation already during the beginning of the exposure to high temperatures, which increases the life of the material more effectively than by other methods such as alloying or cladding, which mainly have to rely on time-consuming diffusion-controlled processes.

The surface modification by application of a silicon-based colloidal liquid with particle sizes in the range of nanometers can provide a uniform distribution of active substance on the surface. This fine dispersion on the surface of the alloy can cause a very homogenous nucleation of aluminum oxide and thus limits aluminum depletion in the matrix, which is not possible by bulk metallurgy. The silicon containing layer formed at the beginning of oxidation also acts as a diffusion barrier for aluminum and oxygen diffusion across the alloy/oxide boundary.

Further, the applied fluid may improve oxidation resistance by means of cleaning, e.g., salt-based adhering impurities may go in solution and/or passivate the surface and/or provide nucleation sites to cause homogenous aluminum oxide growth. The silicon-based surface layer obtained after applying a silicon colloid composition will not considerably modify the emission characteristics of the alloy. Indeed, one object of the invention is to increase the oxidation life by influencing the oxidation process rather than by affecting the emissivity of the surface. A further advantage of the method is that it can be applied independently of the type of alloy or the shape of the part.

For illustrative purposes, some examples of embodiments of the invention will now be described in more detail. First the test procedure will be described.

Test Procedure

Figure 1:
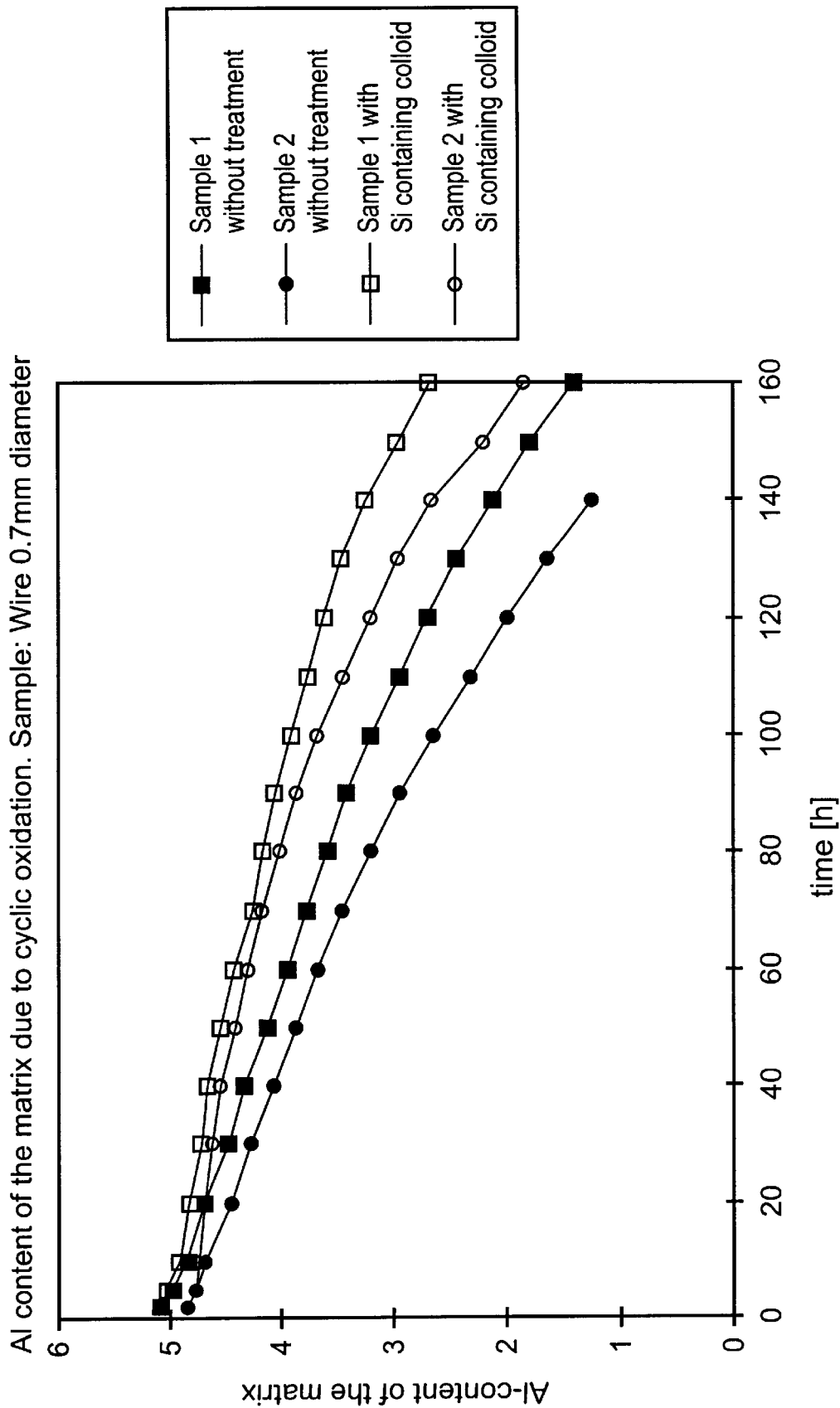
FIG. 1 shows the aluminum content of the matrix due to cyclic oxidation in differently treated pieces of wire.

Samples of alloy are heated by electrical current, which is adjusted to keep the same value of power per surface area for the samples. On-time of the current was 2 min and off-time also 2 min, thereby providing accelerated testing of the high temperature performance in thermal cycling, a method as described in ASTM B78 "Standard Test Method of Accelerated Life of Iron-Chromium-Aluminum Alloys for Electrical Heating." The Al content of the matrix, which decreases with time due to oxidation, is shown in FIG. 1 for a wire sample and in FIG. 2 for a foil sample.

After applying the fluid according to the invention, the samples could be, as mere examples, either directly heated to temperatures in the range of 800 to 1300° C. for oxidation testing, or heated to about 870° C. for about 1 minute in $NH_3$ atmosphere, then cooled and cut, and then measured for oxidation properties at 1000 to 1300° C. in air. In the latter heat treatment, it was found to be sufficient to obtain a dried surface quality of the substrate with an adherent coating, even after mechanical treatment of the substrate, like cutting, bending, etc.

Composition of the Alloy

The composition of the used FeCrAl alloy is of secondary importance since the surface treatment causes the dominating effect. The main essential feature is that the metallic material comprises aluminum, suitably at least 1.5% by weight. A heat-resistant alumina-forming material was used and a "standard composition" of an iron-chromium-aluminum alloy with 2–10% by weight of Al, 10–40% by weight of Cr and balance basically Fe, with or without additions of rare earth metals and/or other alloying additions, and unavoidable impurities.

Coating Method/Thickness

A variety of methods may be used as long as they provide a sufficiently uniform layer, such as sol-gel, PVD, CVD, painting, spraying, etc. Ordinary dipping was also tried (cold or hot solution in combination with cold or warm sample) and it worked in most cases. The success of such treatment depends upon the sample, e.g., the cleanness of the surface, possible residual oil from the rolling, and the fluid itself. Thus, in case of colloidal solutions, care has to be taken as to the temperature of the bath, to avoid the unwanted effect of destroying the colloidal structure.

The thickness of the layer, which depends on the fluid used, is not very critical, however, preferably thinner layers with thicknesses down to monolayers should be used. In case of colloidal Si solutions, thicker coatings tend to flake off from the sample due to crystallization of the fluid.

Advantageously, the surface modification is included into the production process, preferably before final annealing of the material. Thus, a preferred sequence of steps is first cold-rolling the material into a foil, then surface treating the foil and then annealing it. When annealing the surface-modified material, essentially hydrogen gas is preferred to other atmospheres containing traces of $NH_3$.

The surface treatment in the production process can be further improved by warming up the cold-rolled foil, primarily to bring about a drying process to clean the surface of volatile surface impurities. The drying temperature may even be so high that a very thin aluminum oxide scale is formed on the material, which in the case of applying a Si-containing colloid will give an improved adherence to the foil surface. Therefore, advantageously, the sequence of process steps would be first cold-rolling the material into a foil, then drying the foil, then surface treating it and then annealing it.

The resulting average thickness of the applied layer may be in the range of 0.9 nm to 10 micrometres, thereby rendering the mentioned increase of oxidation life. The applied layer should preferably have an average thickness of 5 to 60 nm. In some cases, the applied silicon-rich layer attained a few micro-meters, thereby evidently acting as an additional diffusion barrier during oxidation. The treatment of the surface, as described above, could also be done on material in a finished or semifinished stage or on a finished or semifinished product.

Definition of the Fluids

Several different fluids with different compositions are useful, but not to the same extent. Primarily, silicon-containing fluids are useful, either as a solution or as a suspension, preferably a colloidal suspension. A Si-containing solution may be in the form of a pure solution or a combination solution comprising other elements, such as $Na_2SiO_3$, normally as aqueous solutions. Preferably, any form of Si-containing fluid with a colloidal structure can be used, e.g., x-ray amorphous $SiO_2$ colloidal particles in solution.

A few concrete examples of suitable fluids are (the percentages being by weight):

a) A 40% colloidal dispersion of discrete spherical, amorphous silica in water, with an average particle size of about 15 nm, stabilized by 0.2% $Na_2O$ of anionic character, pH about 9.

b) A 40% colloidal dispersion of discrete spherical, amorphous silica in water, with an average particle size of about 9 nm, stabilized by 0.3% $Na_2O$ of anionic character, pH about 10.

c) A 30% colloidal dispersion of discrete spherical, amorphous silica in water, with an average particle size of about 30 run, stabilized by 0.15% $Na_2O$ of anionic character, pH about 10.

d) A 40% colloidal dispersion of discrete spherical, amorphous silica in water, with an average particle size of about 15 nm, stabilized by an Al salt of cationic character, pH about 3.8.

Furthermore, the concentrations above in examples a) to d) were lowered from 40 to 5.7% with still very good results.

Other Useful Fluids Are:

e) 30% colloidal dispersion of silica and $Al_2O_3$ in water.

f) An aqueous solution of 7% $Na_2SiO_3$ (10 and 20% solutions were also tested with good results).

g) An aqueous solution of 10% $Na_2SiO_3$ and 5% soap (alkali metal salt of fatty acids).

h) Silica gel (by "destabilizing" the colloidal dispersion with, e.g., soap).

i) 40% colloidal dispersion of silica in water with about 5% aluminum nitrate.

j) Silicon oil.

k) 30% colloidal dispersion of silica in alcohol.

The alcohol referred to above could suitably be ethanol or isopropanol.

The main active element in the fluids is silicon, even in very low concentrations. Quite surprisingly, small amounts such as 0.6% by weight of silicon in the fluid gave good oxidation resistance results. Other elements, such as sodium, cannot replace the effect of Si to the same extent (pure Si and/or Si in any combination with other elements) in the oxidation process.

Thickness of the Foil

The effect of increasing the oxidation resistance is not limited to thin foils, the method is applicable on, e.g., wire samples too as well as on bars, tubes, fiber or powders with spherical or irregularly shaped grains. However, the advantageous effects are more pronounced for thin samples, since they do not exhibit spalling i.e., that the coating might flake off.

Spalling of the Al scale depends mainly on the application temperature, temperature cycling, geometry of the sample, impurities, surface roughness and alloy composition. However, samples which exhibit spalling due to various reasons, including the ones listed above, will also have increased oxidation life thanks to the described method.

As an example, a layer applied to the surface by the described method could avoid spalling. According to this example, a surface of a FeCrAl alloy was partly treated with a Si colloidal fluid and then oxidized at 1200° C. Only the untreated part showed a spalled oxide.

Figure 2:
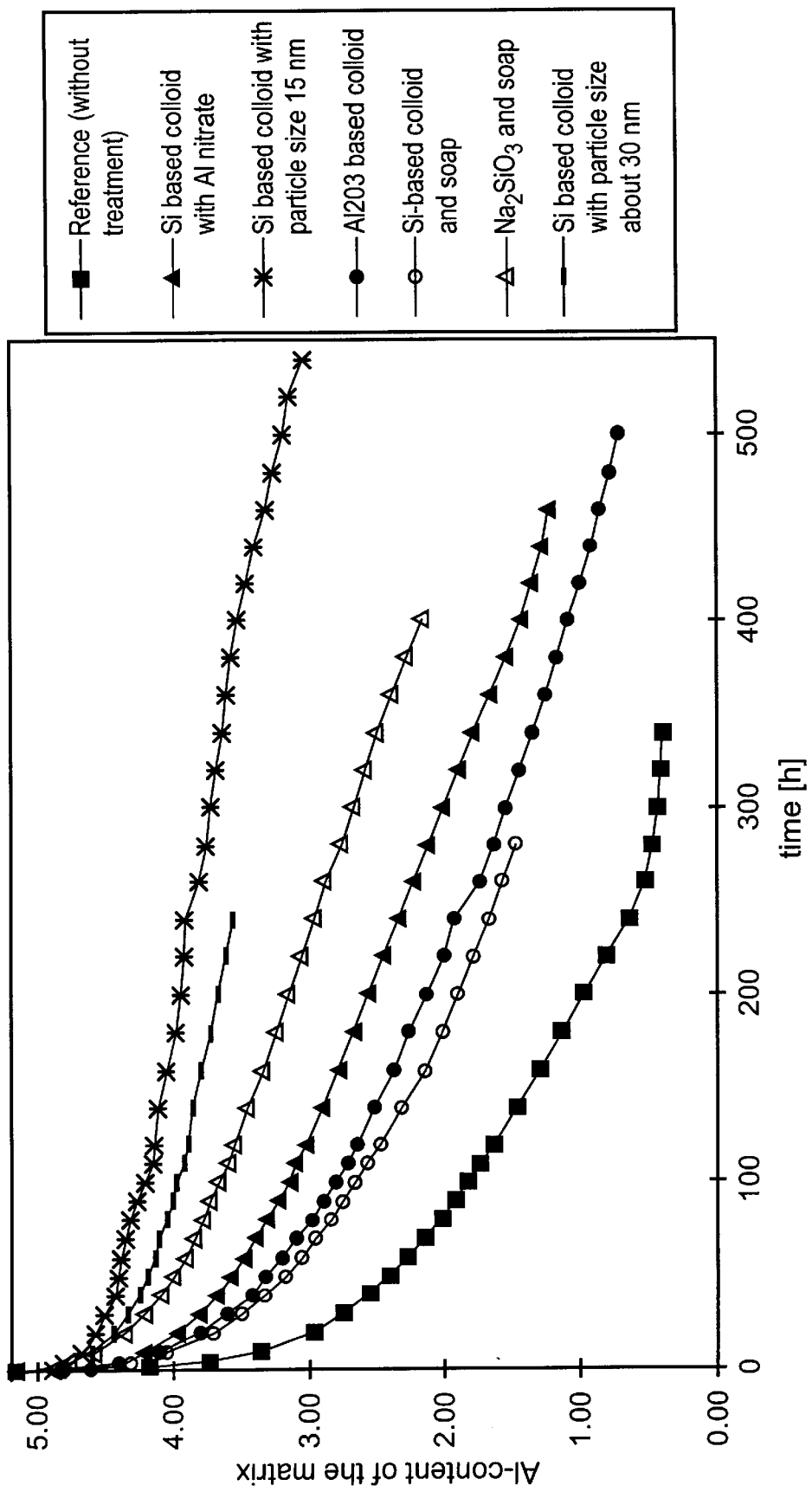
FIG. 2 shows the aluminum content of the matrix due to cyclic oxidation in differently treated foil.

The surprising improvements achieved by the present invention may be readily seen in FIGS. 1 and 2. A wire according to the above "Composition of the Alloy" was monitored relative to the Al content in the matrix over time, two samples having no treatment and two samples being treated with a Si containing colloidal fluid according to the invention. Starting off with the same Al contents, the treated samples showed a significantly higher Al content after about 100 hours.

In FIG. 2, basically the same test was undertaken but with a 50 μm thick foil instead of a wire. The composition was the same as for the wire. Several treatments of the surface were performed and compared with a foil without any treatment. Again, a significant difference of the Al content in the matrixes was established.

In both FIGS. 1 and 2, the test conditions were in accordance with ASTM B78.

In conclusion, the high temperature resistant materials with a modified surface according to the invention show significantly improved resistance to oxidation and spalling. Furthermore, this invention enables a uniform surface modification, which is difficult by conventional alloying with rare earth metals due to their tendency to lack a uniform distribution in the matrix due to their chemical activity.

The principles, preferred embodiments and mode of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A heat and oxidation resistant FeCrAl material containing at least 1.5 weight % aluminum, the material comprising at least one of silicon and silicon-containing compounds applied onto its surface, the surface being in metallic or oxidized condition, thereby resulting in a surface layer or region containing amounts of the at least one silicon and silicon-containing compounds and having an average thickness of 0.9 nm to 10 micrometers.

2. The material of to claim 1, wherein said surface layer comprises at least one of mainly crystalline and amorphous $SiO_2$.

3. The material of claim 1, wherein the average thickness of said surface layer is 5 to 60 nm.

4. The material of claim 1, wherein said material comprises a FeCrAl alloy with 2–10% by weight of Al, 10–40% by weight of Cr and balance basically Fe and unavoidable impurities.

5. The material of claim 4, wherein said alloy further comprises rare earth metals.

6. The material of claim 1, wherein said material is a composite.

7. The material of claim 1, wherein said material is in a form chosen from among a foil, wire, strip, bar, tube, fibre or powder with spherical or irregularly shaped grains.

8. The material of claim 1, in a form chosen from among a thin foil, a wire, a bar, a tube, or a strip.

* * * * *